(12) United States Patent
Gennard et al.

(10) Patent No.: US 10,030,598 B2
(45) Date of Patent: Jul. 24, 2018

(54) VEHICLE MOVEMENT ON AN INCLINED SURFACE

(71) Applicant: Jaguar Land Rover Limited, Whitley, Coventry, Warwickshire (GB)

(72) Inventors: James Gennard, Stourbridge (GB); John Spooner, Kenilworth (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/120,102

(22) PCT Filed: Feb. 18, 2015

(86) PCT No.: PCT/EP2015/053425
§ 371 (c)(1),
(2) Date: Aug. 18, 2016

(87) PCT Pub. No.: WO2015/124634
PCT Pub. Date: Aug. 27, 2015

(65) Prior Publication Data
US 2017/0058808 A1    Mar. 2, 2017

(30) Foreign Application Priority Data

Feb. 18, 2014 (GB) .................................. 1402798.1

(51) Int. Cl.
*F02D 41/10* (2006.01)
*B60W 30/18* (2012.01)
(Continued)

(52) U.S. Cl.
CPC ....... *F02D 41/10* (2013.01); *B60W 30/18027* (2013.01); *F02D 41/14* (2013.01);
(Continued)

(58) Field of Classification Search
CPC .... F02D 41/10; F02D 41/14; F02D 2200/602; B60W 30/18027; B60W 30/18118;
(Continued)

(56) References Cited

U.S. PATENT DOCUMENTS

| 2008/0173518 A1* | 7/2008 | Klusemann ........... B60T 13/746 |
| | | 192/219.4 |
| 2009/0037069 A1* | 2/2009 | Inoue .................... B60W 10/06 |
| | | 701/94 |

(Continued)

FOREIGN PATENT DOCUMENTS

| DE | 19838970 A1 | 3/2000 |
| FR | 2802864 A1 | 6/2001 |
| WO | WO2009037138 A1 | 3/2009 |

OTHER PUBLICATIONS

Combined Search and Examination Report for application No. GB1402798.1, dated Sep. 1, 2014, 6 pages.
International Search Report for International application No. PCT/EP2015/053425, dated Jul. 1, 2015, 7 pages.
(Continued)

*Primary Examiner* — John Kwon
*Assistant Examiner* — Johnny H Hoang
(74) *Attorney, Agent, or Firm* — Reising Ethington P.C.

(57) ABSTRACT

Aspects of the present invention relate to the pull away from rest of a motor vehicle on a slope. The vehicle includes an automatic transmission and internal combustion engine with an electronic controller. The engine torque response to the accelerator pedal input is modified accounting for the slope to improve consistency of pull away on different slopes and reduce the dead pedal feeling on steep slopes.

17 Claims, 3 Drawing Sheets

(51) Int. Cl.
*F02D 41/14* (2006.01)
*G01C 9/00* (2006.01)
*B60W 40/13* (2012.01)
*B60W 50/00* (2006.01)

(52) U.S. Cl.
CPC ......... *G01C 9/00* (2013.01); *B60W 30/18118* (2013.01); *B60W 40/13* (2013.01); *B60W 2050/0008* (2013.01); *B60W 2540/10* (2013.01); *B60W 2550/142* (2013.01); *B60W 2710/0666* (2013.01); *B60W 2720/106* (2013.01); *F02D 2200/602* (2013.01)

(58) Field of Classification Search
CPC ... B60W 2050/0008; B60W 2550/142; B60W 2710/0666; B60W 2720/106; B60W 2540/10; B60W 40/13; G01C 9/00
USPC ... 701/55, 56, 65, 80, 84, 91, 101, 102, 110, 701/115
See application file for complete search history.

(56) References Cited

U.S. PATENT DOCUMENTS

| | | | |
|---|---|---|---|
| 2009/0112386 A1* | 4/2009 | Saitoh | B60L 11/1887 701/22 |
| 2010/0030437 A1* | 2/2010 | Kim | F16H 61/0213 701/65 |
| 2010/0138129 A1* | 6/2010 | Mallet | B60T 7/122 701/83 |
| 2012/0271499 A1* | 10/2012 | Inoue | B60T 7/12 701/23 |
| 2012/0271523 A1* | 10/2012 | Sardari Iravani | B60T 7/122 701/70 |
| 2014/0025267 A1 | 1/2014 | Tezuka et al. | |

OTHER PUBLICATIONS

Written Opinion for International application No. PCT/EP2015/053425, dated Jul. 1, 2015, 8 pages.

* cited by examiner

VEHICLE MOVEMENT ON AN INCLINED SURFACE

TECHNICAL FIELD

The present invention relates to the acceleration of a motor vehicle from rest on an inclined surface, in particular a system and method by which this is achieved.

BACKGROUND OF THE INVENTION

Motor vehicles are well known and are often fitted with automatic transmissions of various types in order to improve comfort and reduce driver workload. It is common for a conventional automatic transmission to include a hydrodynamic torque converter to facilitate launch, or the process of pulling away from a stationary condition. The inherent behaviour of a torque converter leads it to transmit some engine torque to the vehicle when the vehicle is stationary, the transmission has a gear engaged and the engine is at its idle speed. This leads to the vehicle accelerating from rest to a low speed when the brakes are released on a level road surface. This behaviour is known as creep and allows the driver to easily manoeuver the vehicle when parking using only the brakes to control the vehicle speed. Other automatic transmission configurations may provide a similar function by the control of clutches or electric motors. These transmissions could include, but are not limited to automated manual transmissions, automated clutch transmissions, dual clutch transmissions and hybrid or electric transmissions. In this case the transmission provides the function in order to make a parking or low speed manoeuvring more convenient for the driver.

A motor vehicle will generally be fitted with two braking systems, the foundation brakes and parking brake. The foundation brakes are normally applied by the use of a pedal and are used to slow or stop the vehicle in normal driving manoeuvres. The parking brake is normally applied by the use of a lever, a latching pedal or electrical switch and is used when the vehicle is stationary in order to hold the vehicle and allow the driver to leave. It is common for these systems to be electronically assisted or controlled to provide enhanced features such as antilock braking, traction control, drive away release and improved parking force with low lever force. In order to provide these enhanced functions the braking system requires a number of sensors such as wheel speed sensors, vehicle longitudinal acceleration sensors and inclination sensors. The data from these sensors is often available on a vehicle communication network such as a controller area network (CAN) bus and may be used by other controllers, reducing duplication of sensors or improving detection and failsafe behaviour in the event of a sensor failure.

It is known that a vehicle equipped with an automatic transmission will creep as described above on a level surface. On a slight slope the creep will reduce and as the slope increases the vehicle will stop. If the vehicle encounters a steeper slope it will roll backward unless the driver actuates the braking system or accelerates. In order to prevent rolling back on a slope it is known to configure the braking system to maintain pressure in the braking system until the powertrain provides sufficient tractive effort to accelerate the vehicle up the slope. This is commonly known as a 'hill hold' function and makes pull away on a hill more convenient for the driver. Even with the hill hold function the driver will have to apply more accelerator pedal to pull away on a steep slope than on a gentle slope.

It is known that in order to pull away on a steep slope the driver will have to depress the accelerator pedal further than on a gentle slope in order to generate more engine torque and increase the available tractive effort. This is observed as a region of 'dead' travel where the pedal is moving but having no effect on the acceleration of the vehicle.

It is an aim of the present invention to improve control of the powertrain during a hill start so the vehicle will behave in a more consistent manner whatever slope is encountered. The invention will increase the creep torque available as slope increases and reduce dead travel from the accelerator pedal.

SUMMARY OF THE INVENTION

Aspects of the present invention relate to a method of controlling movement of a vehicle; a system including a controller; and a vehicle.

According to an aspect of the invention, there is provided a method for accelerating a vehicle from rest on a slope comprising:

generating an offset value for an accelerator pedal position signal;

combining the offset value with the accelerator pedal position signal to generate a virtual pedal position signal, and;

controlling an engine of the vehicle to produce torque using the virtual pedal position signal.

According to an aspect, there is provided a method comprising generating an accelerator pedal offset which is added to the physical accelerator pedal position to create a virtual pedal position for input into the engine torque control system.

This then controls the engine in a conventional manner using the virtual pedal position in place of the physical accelerator pedal position. The advantage of this method is to increase the slope where the vehicle will creep without the driver needing to press the accelerator pedal. Because the pedal offset is a continuous function, it remains under the control of the driver at all times and reduces or removes the dead travel which would normally be present in the accelerator pedal.

In an embodiment of the invention the accelerator pedal offset is generated by sensing the slope the vehicle is resting on. The slope angle is input into a map which provides an accelerator pedal offset value. The virtual pedal position is calculated by adding the offset to the physical pedal position. This benefits the driver by automatically adjusting the pedal offset making manoeuvring on a slope easier to undertake, particularly if moving slowly.

In an embodiment of the invention the accelerator pedal offset is calculated in a closed loop manner by comparing vehicle acceleration with desired acceleration based on the accelerator pedal position. The difference is used to adjust the accelerator pedal offset and this offset is added to the physical pedal position to provide the virtual pedal position. This has the benefit of reducing the number of sensors required to calculate the accelerator pedal offset. In the event a wheel of the vehicle encounters a local obstacle such as a rock, this embodiment has the advantage that the accelerator pedal offset will be automatically increased to surmount the local obstacle.

In an embodiment of the invention, the pedal offset based on the slope the vehicle is resting on is reduced as the vehicle speed increases. This enhances the pull away from rest and returns the accelerator pedal control to its conventional operation after the pull away phase has completed.

In an embodiment of the invention, the pedal offset based on the slope the vehicle is resting on is increased as the vehicle speed reduces. This is enabled by the speed related function to activate as the vehicle slows on a slope without additional control.

In an embodiment of the invention, the pedal offset may be removed when the brakes are applied. This allows the engine to return to idle when the vehicle is stationary or decelerating. The person skilled in the art will recognise that a brake switch or pressure signal may be used to activate this mode of operation. This method will allow provision of conventional engine braking to assist the operation of the vehicle foundation brakes.

In an embodiment of the invention, the pedal offset is digitally filtered or blended to smooth the application and reduction of torque. The benefit of this embodiment is to prevent sudden torque transitions which would cause discomfort to driver or passengers.

In an embodiment of the invention, signals from foundation and parking brake systems are transmitted across a vehicle network and received by a controller. These signals may include wheel speeds, longitudinal acceleration and vehicle body inclination. There is provided a method comprising the combination of these signals to provide an indication of the slope the vehicle is resting on, even in the case where the vehicle is accelerating or decelerating on the slope. For example, if the vehicle is stationary or moving at constant speed, the longitudinal accelerometer will provide an indication of the vehicle body angle and this may be equivalent to the hill slope. If the vehicle is accelerating, this can be detected as the rate of change of the wheel speed signals, and the value calculated subtracted from the accelerometer signal to calculate the slope. An inclinometer will generally only function correctly when the vehicle is stationary but this can be used to improve the accuracy of the inclination calculated from the accelerometer. The calculation of slope angle may also include use of a calibrated map relating the measured body angle with slope angle allowing for suspension and tyre compression.

In an embodiment of the invention, the pedal offset may be calibrated to allow the vehicle to creep when the brakes are released. The creep speed achieved may be calibrated to reduce as the slope increases or may remain constant at any slope. Reducing creep speed with slope has the advantage of reducing the associated engine speed increase and providing feedback to the driver of a more difficult pull away condition.

In an embodiment of the invention, the method may comprise a calculation of the vehicle mass. The pedal offset map may then consist of a 3 dimensional map based on mass and slope. This embodiment may be useful for vehicles with a large payload capacity or capable of towing heavy trailers. The mass calculation may commonly be achieved by comparison of the vehicle acceleration with the tractive force generated by the powertrain. This may then be averaged over a time period, or distance travelled, to negate the effect of slope. For example the average may be calculated over a time of 5 minutes or 10 km.

In an embodiment of the invention, the method may comprise a function to respond to the vehicle acceleration in a closed loop manner. The vehicle mass estimate may then be updated to reflect the pull away behaviour as the vehicle pulls away. This provides the advantage that the vehicle response may be improved during the first pull away after connecting a trailer or loading the vehicle. A similar benefit may be experienced when disconnecting a trailer or unloading the vehicle.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings.

DETAILED DESCRIPTION

A method of controlling a motor vehicle in accordance with an embodiment of the present invention is described herein with reference to the accompanying figures.

Figure 1:
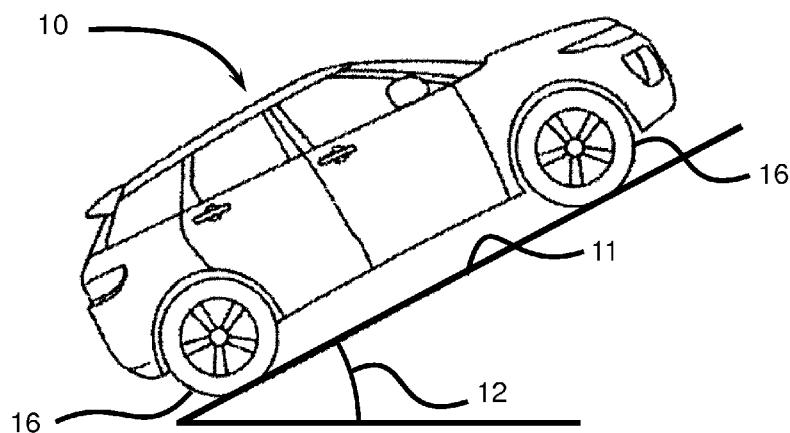
FIG. 1 shows a schematic representation of a vehicle situated on an inclined surface or slope.

With reference to FIG. 1, a vehicle 10 is shown on an inclined slope 11 which has a longitudinal slope angle 12 in relation to the direction of travel of the vehicle. For the purpose of this description, the vehicle starts at rest on the surface. Initially the vehicle is held on the slope by braking using the foundation brakes. When the driver releases the brake pedal a hill holding function provided by the brake system, as known in prior art, maintains the brake force and continues to hold the vehicle preventing it from rolling backward. In order for the vehicle to pull away forward up the slope a torque is applied to wheels 16. As the wheel torque increases, the braking system receives an indication of this torque and releases the brakes as the wheel torque equals the torque required to hold the vehicle. As the wheel torque exceeds the torque required to hold the vehicle on the slope the vehicle will start to accelerate up the slope. A system in accordance with embodiments of the present invention may be calibrated to allow the vehicle to perform this pull away to a slow creep speed, such as 5 kph, without driver application of the accelerator pedal. The same methodology may apply if the park brake were used to hold the vehicle on the slope.

Figure 2:
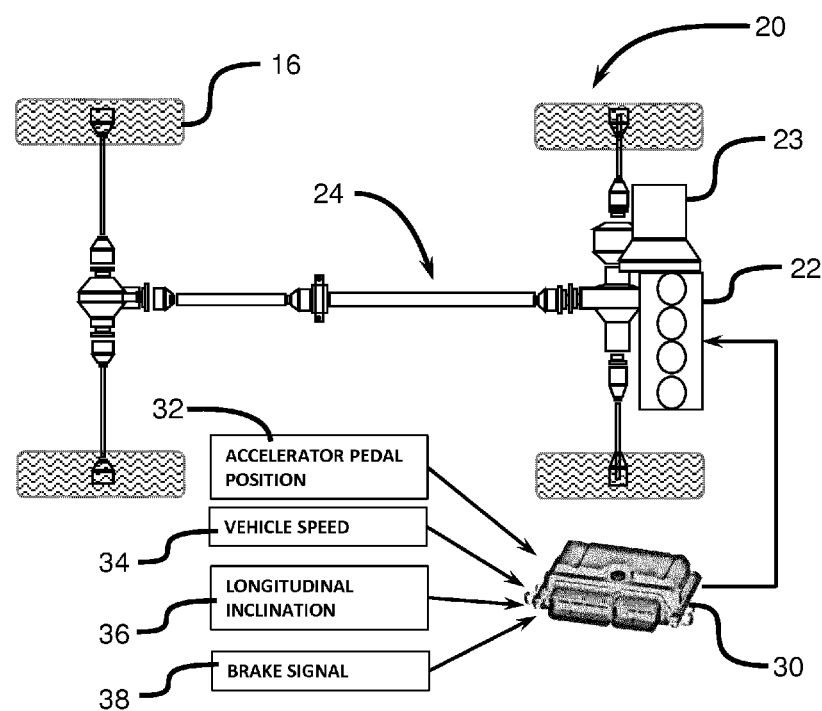
FIG. 2 shows a schematic representation of a system designed according to an embodiment of this invention for controlling the movement of the vehicle along an inclined surface.

With reference to FIG. 2, the powertrain 20 of the vehicle is shown in plan view. The engine 22 generates torque and drives the transmission 23. The torque is transferred through the driveline 24 to the wheels and generates a tractive effort to move the vehicle. Controller 30 is operatively connected to the engine 22 and provides inputs to actuators on the engine to control the generation of torque. Methods of electronic control of an engine are well known and need not be described here. In accordance with aspects and/or embodiments of the present invention, the controller 30 receives input data regarding the accelerator pedal 32, vehicle speed 34, longitudinal inclination 36 and brakes 38; these are used to influence the generation of torque. The data 36 regarding the inclination of the vehicle on the slope is used to calculate a requirement for increased torque generation by the engine to allow the vehicle to creep up the slope without the driver pressing the accelerator.

Figure 3:
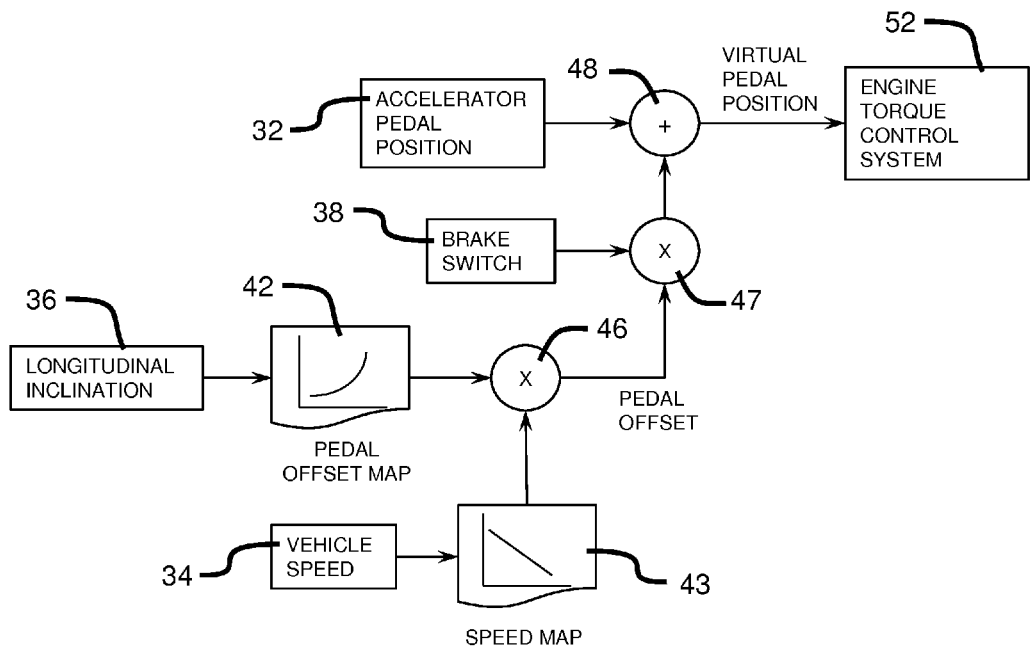
FIG. 3 shows a block diagram summarizing an example of the control method designed according to an embodiment of this invention.

With reference to FIG. 3, the controller 30 incorporates software to implement the procedure as shown in the block diagram in addition to the conventional engine control software. In normal operation the accelerator pedal position signal 32 is sent to the engine torque control system 52 and the driver controls the engine torque in a conventional manner. In order to implement the invention described here an additional pedal offset signal is added at point 48 to offset the pedal signal which may request an increase in engine torque as if a larger driver pedal demand was present. The pedal offset signal is primarily calculated from the longitudinal inclination 36 using a pedal offset map 42. For vehicles which may carry heavy loads or tow heavy trailers an additional axis may be added to this map to modify the offset signal dependant on train mass. As the vehicle moves away from rest and accelerates it is necessary for the pedal action to return to a conventional map and this is achieved by reference to the vehicle speed input 34 into the speed map 43. This map provides a multiplier for the pedal offset applied at point 46, typically varying from 1 when the vehicle is stationary to 0 when the vehicle speed reaches 10 mph. At speeds above 10 mph the 0 multiplier has the effect of nullifying any initial pedal offset due to inclination. It will be appreciated that 10 mph is a typical example speed but it will be apparent that the value and the associated map may be calibrated to suit a vehicle application or may vary dependant on which gear is engaged. In a similar process, the brake switch signal 38 is used to nullify the pedal offset when the brakes are applied. This is achieved by multiplying the pedal offset output from point 46 by the brake signal at point 47 where the brake signal is 0 when the brake is applied and 1 when it is released. This offset is then added to the measured pedal position at point 48. Sudden changes in accelerator signal may cause uncomfortable reactions by the engine torque control system so the pedal offset signal may be filtered or blended to smooth these unwanted transitions.

Figure 4:
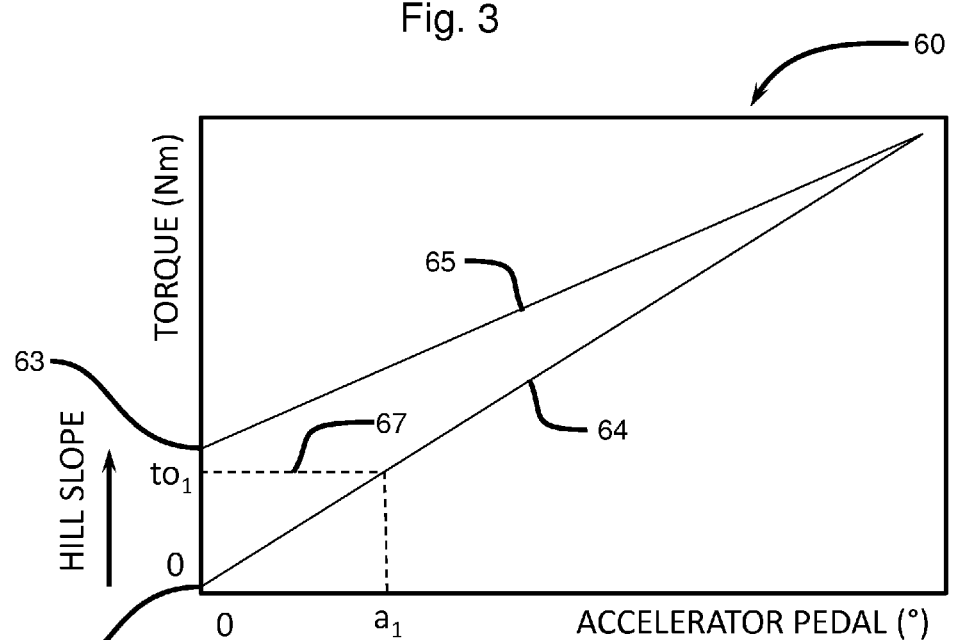
FIG. 4 shows a graph illustrating the torque produced in response to an accelerator position with the vehicle situated on two different slopes.

With reference to FIG. 4, a graph 60 is shown relating torque to the physical accelerator pedal position. This is indicative of embodiments and the skilled observer will understand that this is a simplified section through a map which also incorporates engine speed. A full map would consist of a torque surface in the Z (vertical) axis where the accelerator pedal position in the X axis and engine speed in the Y axis are input and the required engine torque is output. The shape of the map is also simplified to a line in order to illustrate the specific embodiment but the map is not restricted to a line. The normal operation is shown by line 64 which shows torque increasing as the accelerator is pressed. The operation of the control system when the vehicle is on a slope is shown in line 65 where the line 64 has been offset to provide higher torque at a given accelerator position. An example is where the accelerator pedal is released and point 62 moves up to point 63 when the vehicle is on a slope. The offset will have been calculated according to the block diagram shown in FIG. 3. The dead travel of the accelerator pedal as would be apparent in the prior art is shown by dashed line 67. The torque required to hold the vehicle on the slope is to$_1$, so conventional operation according to the prior art would require the pedal to be moved past position a$_1$ in order to pull away up the slope with the torque produced following line 64. In accordance with aspects and/or embodiments of the invention, the torque response will follow line 65 so the accelerator is immediately active from 0 angle as soon as pressed by the driver. The offset between torque to1 and point 63 is a creep torque offset provided to allow the vehicle to creep slowly up the slope without driver input.

In an embodiment, upon driver release of a brake pedal, the offset to point 63 is immediately applied. Consequently, the engine of a vehicle will respond immediately (in practice, as quickly as it is able) to provide the torque correlating to the point 63 offset. During this short period of time controllers in the vehicle maintain braking force to prevent roll-back until the torque is at least equal to that required to hold the vehicle stationary, and then allow release. In an embodiment, the offset to point 63 is immediately applied upon a driver selection of a drive mode of a gearbox (for example, selection of 'D' as common in automotive applications). As such selection (especially from 'Park') normally requires the application of a brake pedal, the offset is then already applied as the driver releases the brake pedal. Creep speed in either of these embodiments is thus available immediately upon release of the brake pedal and any driver movement of accelerator pedal will then immediately result in a vehicle response with no 'dead' travel of the accelerator pedal.

Figure 5:
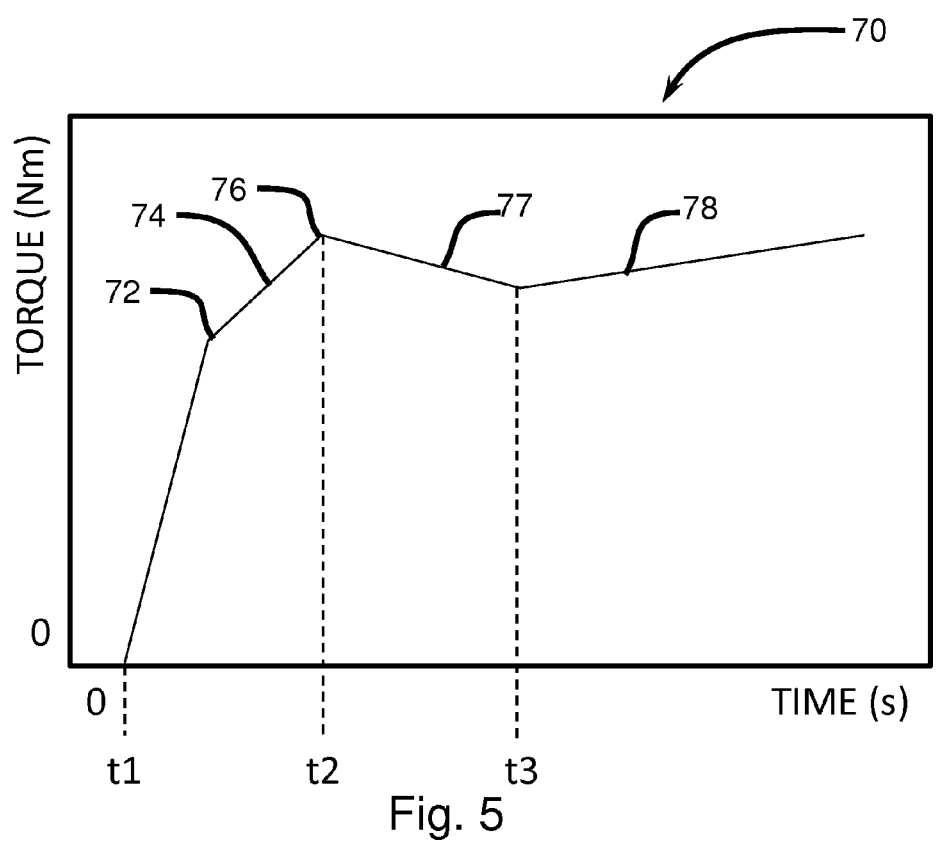
FIG. 5 shows a graph illustrating torque applied over time as the vehicle pulls away on a slope.

With reference to FIG. 5, a graph 70 shows the torque produced against time for a pull away event according to an embodiment of the invention. At time t1 the brake pedal is released and the engine automatically starts to increase torque to point 72. At this point the brake system equates the tractive effort with the slope resistance and releases the brakes. The torque continues to increase as shown by line 74 to point 76 at time t2. If the driver presses the accelerator pedal during this phase, the torque increases proportionally. This provides acceleration for the vehicle and it is allowed to increase speed. At time t2 the torque starts to reduce (assuming a constant accelerator pedal position) based on the vehicle speed input dependant on map 43 so the multiplier at point 46 has become 0 and it now follows line 77. When the vehicle reaches time t3 the pedal offset is removed by map 43 and engine torque follows the accelerator pedal demand as shown by line 78.

It will be appreciated that various changes and modifications can be made to the present invention without departing from the scope of the present application.

The invention claimed is:

1. A method for accelerating a vehicle from rest on a slope comprising:
    determining a gradient of the slope on which the vehicle is positioned,
    generating an offset value for an accelerator pedal position signal taking into account the gradient;
    combining the offset value with the accelerator pedal position signal to generate a virtual pedal position signal, and;
    controlling an engine of the vehicle to produce torque using the virtual pedal position signal,
    wherein the offset value is applied whether the accelerator pedal is depressed or is not depressed.

2. The method of claim 1, comprising:
    calculating a desired acceleration of the vehicle taking into account the accelerator pedal position signal;
    determining an actual acceleration of the vehicle;
    adjusting the offset value to the accelerator pedal position based on the difference between the actual and desired vehicle acceleration, and;

repeating the above steps in a closed loop manner in order that actual acceleration approaches the desired acceleration.

3. The method of claim 1, comprising:
determining vehicle speed, and;
reducing the offset value as the vehicle speed increases.

4. The method of claim 1, comprising:
determining vehicle speed, and;
increasing the offset value as the vehicle speed decreases.

5. The method of claim 1, comprising a removal of the offset value when vehicle brakes are applied.

6. The method of claim 1 wherein the offset value is filtered or blended to achieve a smooth transition.

7. The method of claim 1, wherein determination of the gradient is achieved taking into account any difference between vehicle acceleration as measured based on wheel speeds and vehicle acceleration as measured by a longitudinal acceleration sensor.

8. The method of claim 1, comprising calibration of the offset value to enable a creep speed without depression of the accelerator pedal.

9. The method of claim 8 wherein creep speed is enabled upon release of vehicle brakes.

10. The method of claim 8, comprising a calibrated variance of creep speed with gradient.

11. The method of claim 1, comprising:
generating a vehicle mass estimate taking into account vehicle acceleration and a tractive effort produced by the engine;
determining an average of the vehicle mass estimate over a period of time, and;
modifying the offset value taking into account the time averaged vehicle mass estimate.

12. The method of claim 11, comprising a closed loop estimation function responsive to vehicle acceleration in order to modify the vehicle mass estimate.

13. A controller for implementing the method of claim 1.

14. A vehicle comprising a controller as claimed in claim 13.

15. A system for controlling movement of a vehicle, comprising:
at least one vehicle sensor to provide an indication of a gradient of a slope the vehicle is at rest on;
an engine controller configured to provide torque at pull away, said torque being dependent on the gradient and on an accelerator pedal position signal.

16. A vehicle comprising:
an engine;
an accelerator pedal sensor configured to provide an indication of a driver intent to accelerate the vehicle;
one or more brake sensors configured to provide an indication of the driver intent to release brakes of the vehicle;
one or more sensors configured to provide an indication of a gradient of a slope the vehicle is at rest on;
a control system configured to control the engine of the vehicle to provide torque to accelerate the vehicle up the slope in response to an indication of a driver intent provided from the accelerator pedal sensor, said torque varying in dependence on the gradient and on an accelerator pedal position signal received from the accelerator pedal sensor.

17. The method of claim 1, wherein the offset value is non-zero at least while the accelerator pedal is depressed.

* * * * *